Patented June 28, 1932

1,865,405

UNITED STATES PATENT OFFICE

ERNST WINTER, OF COLOGNE-ON-THE-RHINE-BRAUNSFELD, AND ALBERT GRIMM, OF KNAPSACK, NEAR COLOGNE-ON-THE-RHINE, GERMANY, ASSIGNORS TO AKTIENGE-SELLSCHAFT FUR STICKSTOFFDUNGER, OF KNAPSACK, NEAR COLOGNE-ON-THE-RHINE, GERMANY, A CORPORATION

PROCESS OF PREPARING ACETIC ANHYDRIDE

No Drawing. Application filed September 8, 1931, Serial No. 561,696, and in Germany February 15, 1927.

The present invention relates to a process of preparing acetic anhydride.

It is known that acetic anhydride may be made by treating a salt or salts of acetic acid in a dry state with phosgene. The direct manufacture of acetic anhydride by causing phosgene to act upon acetic acid has hitherto been unknown.

According to the present invention acetic anhydride is made by treating acetic acid with phosgene in the presence of a catalyst. As catalysts can be used compounds of metals whose chlorides are transformed into acetates with elimination of hydrochloric acid when heated with acetic acid, and whose acetates rather easily split off acetic acid. Only such metal compounds of the character described are operative as are dissolved in heated acetic acid. Suitable catalysts are, for instance, compounds of the 2nd and 3rd groups of the periodic system, such as, for instance, of magnesium, calcium, strontium, barium and aluminium; furthermore compounds of the metals of the iron group and compounds of the fourth group of the periodic system and of the group of the rare earths, such as compounds of cerium can be used. The catalyst may be used in the form of a salt of a mineral acid such as hydrochloric acid or in the form of the corresponding carbonate or as a salt of an organic acid such as acetic acid or in the form of oxide.

In the hitherto known processes of preparing acetic anhydride by reacting with phosgene upon solid salts of acetic acid it was only with great difficulty that the reaction could be performed in a continuous manner. Contrary thereto, our new process can easily be performed in a continuous manner since as after the addition of the catalyst only liquefied and gaseous reagents are introduced into the reaction mixture and since as beside the acetic anhydride only gaseous reaction products are formed, the catalyst being regenerated continuously. For working continuously it is only necessary to add the corresponding amount of acetic acid and phosgene in the same degree as the acetic anhydride is formed. The gases evolved from the hot reaction mixture are cooled in a condenser whereby acetic anhyride and acetic acid are liquefied. The mixture is fractionated in a column which is connected with the reaction vessel in such a manner that the acetic acid flows continuously back into the vessel.

The reaction can be performed at the boiling point of the acetic acid as well as at lower temperatures from about 80° C. upwards such as from about 80° C.–100° C. At any rate the temperature must be kept so high that the metal compound is decomposed into the acetate. Furthermore particularly when working continuously one can start at the boiling point of acetic acid whereupon the temperature can be lowered down to about 80° C. In spite of this lower temperature acetic acid and acetic anhydride vapors are evolved due to the evolution of large quantities of hydrochloric acid and carbon dioxide whereby the said acetic acid and acetic anhydride are carried over.

The following examples serve to illustrate the invention, but they are not intended to limit it thereto:

1. Acetic acid, advantageously of the highest concentration, is mixed with about 10 per cent. of its weight of anhydrous aluminium chloride. The mixture is heated to boiling and boiling is continued until the aluminium chloride is dissolved. A moderate current of phosgene is then passed through the boiling solution. In order to avoid losses of entrained acetic acid, the hydrochloric acid gas and carbonic acid gas which escape may be passed through cool acetic acid. When a quantity of phosgene sufficient for the transformation has been caused to react with the acetic acid, the whole is kept boiling for some time in order to obtain the product as free from chlorine as possible. The anhydride, which is obtained in a good yield, may be completely purified by distilling it in the usual manner.

2. Acetic acid is mixed as above indicated with about 10 per cent. of its weight of anhydrous magnesium acetate, and the mixture is heated to boiling until the magnesium acetate is dissolved. Phosgene is then introduced into the boiling solution until a sufficient transformation into acetic anhydride is effected. The further treatment is the same as indicated in Example 1.

3. 50 g. of magnesium oxide are dissolved in 1.2 kg. of glacial acetic acid and into the solution after being heated to boiling a current of 500 g. of phosgene is slowly introduced. The further treatment is the same as indicated in Example 1.

4. 60 g. of cerium carbonate are dissolved in 1.2 kg. of glacial acetic acid and into the mixture after being heated to boiling a current of 900 g. of phosgene is slowly introduced whereupon the reaction mixture is further treated as indicated in Example 1.

5. 100 g. of aluminium acetate (anhydrous) are dissolved in 1.2 kg. glacial acetic acid and into the mixture after being heated to boiling 900 g. of phosgene are slowly introduced whereupon the resulting crude anhydride is purified by distillation.

6. 100 g. of anhydrous ferric chloride are introduced into 1.2 kg. of glacial acetic acid and into the mixture having been heated to boiling, 900 g. of phosgene are slowly introduced, whereupon the resulting reaction product is distilled.

7. 60 g. of lanthanum carbonate are dissolved in 1.2 kg. of glacial acetic acid and into the mixture heated to boiling there are introduced 900 g. of phosgene and the reaction mixture is worked up by fractionating.

8. 30 g. of yttrium oxide are dissolved in 1.2 kg. of glacial acetic acid and into the solution heated to 100° C. there are introduced 500 g. of phosgene. The reaction product obtained is freed from hydrochloric acid by fractionating and then distilled in the usual manner.

9. 80 g. of anhydrous nickel chloride are dissolved in 1.2 kg. of glacial acetic acid and 900 g. of phosgene are introduced at 80° C.–100° C. and the reaction product obtained is purified by distillation.

This application is a continuation in part of U. S. application Serial Number 345,582 filed March 8, 1929.

We claim:

1. The process of preparing acetic anhydride which comprises treating acetic acid with phosgene in the presence of a metal compound which is soluble in heated acetic acid and whose chloride when heated with acetic acid is transformed into the acetate, the treatment of the acetic acid with phosgene being effected at a temperature at which the said metal compound is decomposed into the acetate.

2. The process of preparing acetic anhydride which comprises treating at a temperature of between 80° C. and 100° C. acetic acid with phosgene in the presence of a metal compound which is soluble in heated acetic acid and whose chloride when heated with acetic 3. The new process which comprises treating boiling acetic acid with phosgene in the presence of a metal compound which is soluble in heated acetic acid and whose chloride when heated with acetic acid, is transformed into the corresponding acetate.

4. The new process which comprises treating acetic acid with phosgene in the presence of a compound of a metal selected from the group consisting of the second and third group of the periodic system, which is soluble in heated acetic acid and whose chloride when heated with acetic acid is transformed into the acetate, the treatment of the acetic acid with phosgene being effected at a temperature at which the said metal compound is decomposed into the acetate.

5. The new process which comprises treating acetic acid with phosgene in the presence of a salt of a metal selected from the group consisting of the second and third group of the periodic system, which is soluble in heated acetic acid and whose chloride when heated with acetic acid is transformed into the acetate, the treatment of the acetic acid with phosgene being effected at a temperature at which the said metal compound is decomposed into the acetate.

6. The new process which comprises treating acetic acid with phosgene in the presence of a chloride of a metal selected from the group consisting of the second and third group of the periodic system, which is soluble in heated acetic acid and whose chloride when heated wth acetic acid is transformed into the acetate, the treatment of the acetic acid with phosgene being effected at a temperature at which the said metal compound is decomposed into the acetate.

7. The process of preparing acetic anhydride, which comprises treating boiling acetic acid with phosgene in the presence of aluminium chloride.

8. The process of preparing acetic anhydride, which comprises treating boiling acetic acid with phosgene in the presence of 10 per cent of its weight of aluminium chloride.

9. The new process which comprises treating acetic acid with phosgene in the presence of an oxide of a metal selected from the group consisting of the second and third group of the periodic system, which is soluble in heated acetic acid and whose chloride when heated with acetic acid is transformed into the acetate, the treatment of the acetic acid with phosgene being effected at a temperature at which the said metal compound is decomposed into the acetate.

10. The new process which comprises introducing phosgene into boiling acetic acid in the presence of a metal compound which is soluble in heated acetic acid and whose chloride when heated with acetic acid is transformed into the acetate, lowering the temperature gradually down to about 80° C. in the course of the reaction, adding the corresponding amount of acetic acid and phosgene in the same degree as the acetic anhydride is formed.

In testimony whereof, we affix our signatures.

ERNST WINTER.
ALBERT GRIMM.